US011865992B2

(12) United States Patent
Mungall et al.

(10) Patent No.: US 11,865,992 B2
(45) Date of Patent: Jan. 9, 2024

(54) AIRBAG COVER

(71) Applicant: McLaren Automotive Limited, Woking (GB)

(72) Inventors: Daniel Mungall, Woking (GB); Kingsley Ohuka, Woking (GB); Matteo Moscatelli, Woking (GB); Tom Sellen, Woking (GB)

(73) Assignee: McLaren Automotive Limited, Woking (GB)

( * ) Notice: Subject to any disclaimer, the term of this patent is extended or adjusted under 35 U.S.C. 154(b) by 0 days.

(21) Appl. No.: 17/749,981

(22) Filed: May 20, 2022

(65) Prior Publication Data
US 2022/0371537 A1 Nov. 24, 2022

(30) Foreign Application Priority Data

May 21, 2021 (GB) ...................................... 2107308

(51) Int. Cl.
*B60R 21/215* (2011.01)
*B60R 21/216* (2011.01)
(Continued)

(52) U.S. Cl.
CPC ........ *B60R 21/2165* (2013.01); *B60R 21/203* (2013.01); *B60R 21/205* (2013.01);
(Continued)

(58) Field of Classification Search
CPC . B60R 21/215; B60R 21/216; B60R 21/2165; B60R 21/205; B60R 21/206;
(Continued)

(56) References Cited

U.S. PATENT DOCUMENTS 5,447,329 A    9/1995   Hamada
5,803,489 A    9/1998   Nusshor
(Continued)

FOREIGN PATENT DOCUMENTS

DE      19824735     12/1999
DE      10316272     11/2004
(Continued)

OTHER PUBLICATIONS

Search Report in United Kingdom Appln. No. GB2107308.5, dated Oct. 13, 2021, 3 pages.
(Continued)

*Primary Examiner* — Keith J Frisby
(74) *Attorney, Agent, or Firm* — Fish & Richardson P.C.

(57) ABSTRACT

A vehicle comprising: an airbag device comprising a housing and an airbag, the airbag having a packed configuration and an expanded configuration, the airbag expanding through the aperture in the housing when moving from the packed configuration to the expanded configuration; a composite material panel positioned to cover the airbag device, the panel comprising a break line running over the panel, the break line being proximal to the aperture so that when the airbag moves to the expanded configuration the airbag forces the panel to tear along the break line; and a first protection flap, the first protection flap having an initial configuration where the first protection flap is located adjacent the airbag in the packed configuration and a deployed configuration where the first protection flap covers at least one edge of the panel that runs along one side of the break line when the panel has torn due to the airbag moving to the expanded configuration.

19 Claims, 9 Drawing Sheets

(51) Int. Cl.
  *B60R 21/2165* (2011.01)
  *B60R 21/205* (2011.01)
  *B60R 21/206* (2011.01)
  *B60R 21/203* (2006.01)
  *B60R 21/232* (2011.01)
  *B60R 21/231* (2011.01)

(52) U.S. Cl.
  CPC .......... *B60R 21/206* (2013.01); *B60R 21/215* (2013.01); *B60R 21/216* (2013.01); *B60R 21/232* (2013.01); *B60R 2021/23169* (2013.01)

(58) Field of Classification Search
  CPC ........ B60R 21/203; B60R 2021/21512; B60R 2021/2161
  See application file for complete search history.

(56) References Cited

U.S. PATENT DOCUMENTS

| | | |
|---|---|---|
| 2002/0153710 A1 | 10/2002 | Gray et al. |
| 2009/0256340 A1 | 10/2009 | Williams et al. |
| 2010/0219618 A1* | 9/2010 | Rick .................. B60R 21/2165 280/728.3 |
| 2012/0315446 A1 | 12/2012 | Wisniewski et al. |
| 2020/0391421 A1* | 12/2020 | Stroebe ............... B29C 37/0057 |

FOREIGN PATENT DOCUMENTS

| | | |
|---|---|---|
| DE | 102012220979 | 5/2014 |
| DE | 102012220979 A1 * | 5/2014 |
| DE | 102019133499 A1 * | 6/2021 |
| FR | 2899175 | 10/2007 |
| FR | 2899175 A1 * | 10/2007 |
| WO | WO 2007/118991 | 10/2007 |

OTHER PUBLICATIONS

Extended European Search Report in European Appln. No. 22174677.9, dated Oct. 21, 2022, 7 pages.

* cited by examiner

AIRBAG COVER

CROSS-REFERENCE TO RELATED APPLICATIONS

This application claims priority to GB Patent Application Serial No. 2107308.5, filed on May 21, 2021, the entire contents of which are hereby incorporated by reference.

This invention relates to a vehicle comprising an airbag device and a composite material panel. The invention also relates to a composite material panel.

Airbag devices are a common safety feature in most vehicles. The airbag devices are located in regions of the vehicle that are likely to be contacted by an occupant in the event of a collision. The airbag devices deploy when the vehicle senses that a collision has taken place causing an airbag to fill with gas so that it expands into an expanded configuration to cushion the impact of an occupant against regions of the vehicle interior.

The airbag devices may be located in front of the occupants, such as in the steering wheel, instrument panel, facia panel located in front of a non-driving seat, and side columns of the vehicle. In each case, these protect the occupant from particular collision situations.

In high performance vehicles and/or vehicles that are at least partially battery powered, it is desirable to attempt to keep the overall weight of the vehicle as low as possible. In the case of high-performance vehicles, this is so that handling and acceleration can be improved. In the case of vehicles that are at least partially battery powered, this can increase the range of the vehicles.

The use of composite materials in a vehicle is one method of reducing the total weight of the vehicle. Composite materials may be used to manufacture components of the vehicle. For instance, they can be used to form external body panels of the vehicle. Composite materials can also be used to form internal panels such as those that form parts of the facia or side columns of the vehicle. The composite material may be fibre-reinforced composite (FRC) materials. Such materials typically comprise a matrix that contains reinforcing fibres. As an example, the matrix could be an epoxy resin and the fibres could be carbon fibre (CF) strands. Materials of this type can have good strength in comparison to their weight. One example method by which FRC materials can be formed is resin transfer moulding. Another process for forming FRC materials uses reinforcing fibres that are pre-impregnated with a matrix material such as resin. These are generally known as pre-preg. These reinforcing fibres can be laid up in a mould cavity and then the pre-impregnated matrix material can be cured, typically by heating the mould body. The heating may take place in an autoclave. Once the resin has become solid the mould can be opened and the resulting component removed.

Panels that are formed of composite materials that overlay an airbag device typically have a cut out in the panel through which the airbag device deploys its airbag. A filler panel is inserted in the cut out to fill the hole during normal use of the vehicle. It can be difficult to seal this filler panel to the surrounding panel in a manner that means it is both releasable in the event of a collision but is secured sufficiently that it does not cause unwanted noises or sealed sufficiently that material cannot pass through the joint between the filler panel and the surround. In addition, the direction of the fibres in a composite material are important for the strength of the panel. It can be difficult to obtain high levels of alignment between fibres in two different pieces. This can effect the strength and also visual appearance of the panels.

It would therefore be desirable for there to be an improved way of using panels formed of composite materials as a cover for an airbag device.

According to a first aspect of the present invention there is provided a vehicle comprising: an airbag device comprising a housing and an airbag, the airbag having a packed configuration and an expanded configuration, the airbag expanding through the aperture in the housing when moving from the packed configuration to the expanded configuration; a composite material panel positioned to cover the airbag device, the panel comprising a break line running over the panel, the break line being proximal to the aperture so that when the airbag moves to the expanded configuration the airbag forces the panel to tear along the break line; and a first protection flap, the first protection flap having an initial configuration where the first protection flap is located adjacent the airbag in the packed configuration and a deployed configuration where the first protection flap covers at least one edge of the panel that runs along one side of the break line when the panel has torn due to the airbag moving to the expanded configuration.

According to a second aspect of the present invention there is provided a vehicle comprising: an airbag device comprising a housing and an airbag, the airbag having a packed configuration and an expanded configuration, the airbag expanding through the aperture in the housing when moving from the packed configuration to the expanded configuration; and a composite material panel positioned to cover the airbag device, the panel comprising a break line running over the panel, the break line being proximal to the aperture so that when the airbag moves to the expanded configuration the airbag forces the panel to tear along the break line.

The composite material panel may be formed of reinforcement material interspersed with matrix material. The reinforcement material may be carbon fibre. The composite material panel may be formed of fibre-reinforced polymer.

The aperture in the housing may be a chute through which the airbag expands when moving to the expanded configuration.

The break line may form a closed path running over the panel. The break line may be formed of perforations in the panel along the break line. The break line may be a groove in the panel. The groove may be formed in a surface of the panel facing the airbag device. The groove may be broken by full thickness portions of the panel. The groove may be formed by cutting the groove into the panel. The groove may be formed during a forming process for the panel by laying up reinforcement material with a gap to form the groove. The panel may be formed of a continuous layer of reinforcement material which forms a surface visible from within the vehicle, and layers of reinforcement material applied to the surface of the panel facing the airbag device with a gap to form the groove. The break line may be formed by a series of micro-drilled holes.

The panel may comprise a detachable portion within the break line and a fixed portion outside of the break line, the detachable portion may become at least partially detached when the airbag forces the panel to tear along the break line, the vehicle may comprise a tether attached between the detachable portion and the fixed portion. The tether may permit the detachable portion to move away from the airbag device prior to rotating about an axis defined by the tether. The airbag device may be positioned relative to the panel so that when the airbag moves to the expanded configuration the airbag forces the panel to tear starting from a portion of the break line remote from the tether. The vehicle may comprise a second protection flap, the second protection flap may be attached to the detachable portion, the second protection flap may be configured to cover at least one edge of the detachable portion once the detachable portion is at least partially detached.

The vehicle may comprise an occupant cabin and the panel may form a visible surface of the occupant cabin. The vehicle may comprise an occupant cabin and the panel may form part of a facia of the occupant cabin. The vehicle may comprise an occupant cabin and the panel may form part of a pillar of the occupant cabin. The airbag device may be one of: a front airbag device in the occupant cabin, a side airbag device in the occupant cabin, a driver airbag device mounted in a steering wheel of the vehicle, a knee airbag in the occupant cabin, a head airbag in the occupant cabin, and a curtain airbag in a headlining of the occupant cabin.

According to a third aspect of the present invention there is provided a composite material panel for covering an airbag device comprising a housing and an airbag, the airbag having a packed configuration and an expanded configuration, the airbag expanding through the aperture in the housing when moving from the packed configuration to the expanded configuration, the composite material panel comprising a break line running over the panel, the break line being capable of tearing when the composite material panel is positioned so that the break line is proximal to the aperture and the airbag moves to the expanded configuration to force the panel to tear along the break line.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle comprising an airbag device comprising a housing and an airbag, the airbag having a packed configuration and an expanded configuration, the airbag expanding through the aperture in the housing when moving from the packed configuration to the expanded configuration. The vehicle also comprises a composite material panel positioned to cover the airbag device, the panel comprising a break line running over the panel, the break line being proximal to the aperture so that when the airbag moves to the expanded configuration the airbag forces the panel to tear along the break line. The vehicle may also comprise a first protection flap, the first protection flap having an initial configuration where the first protection flap is located adjacent the airbag in the packed configuration and a deployed configuration where the first protection flap covers at least one edge of the panel that runs along one side of the break line when the panel has torn due to the airbag moving to the expanded configuration. The present invention also relates to a composite material panel for covering an airbag device comprising a housing and an airbag, the airbag having a packed configuration and an expanded configuration, the airbag expanding through the aperture in the housing when moving from the packed configuration to the expanded configuration. The composite material panel comprises a break line running over the panel, the break line being capable of tearing when the composite material panel is positioned so that the break line is proximal to the aperture and the airbag moves to the expanded configuration to force the panel to tear along the break line.

Figure 1:
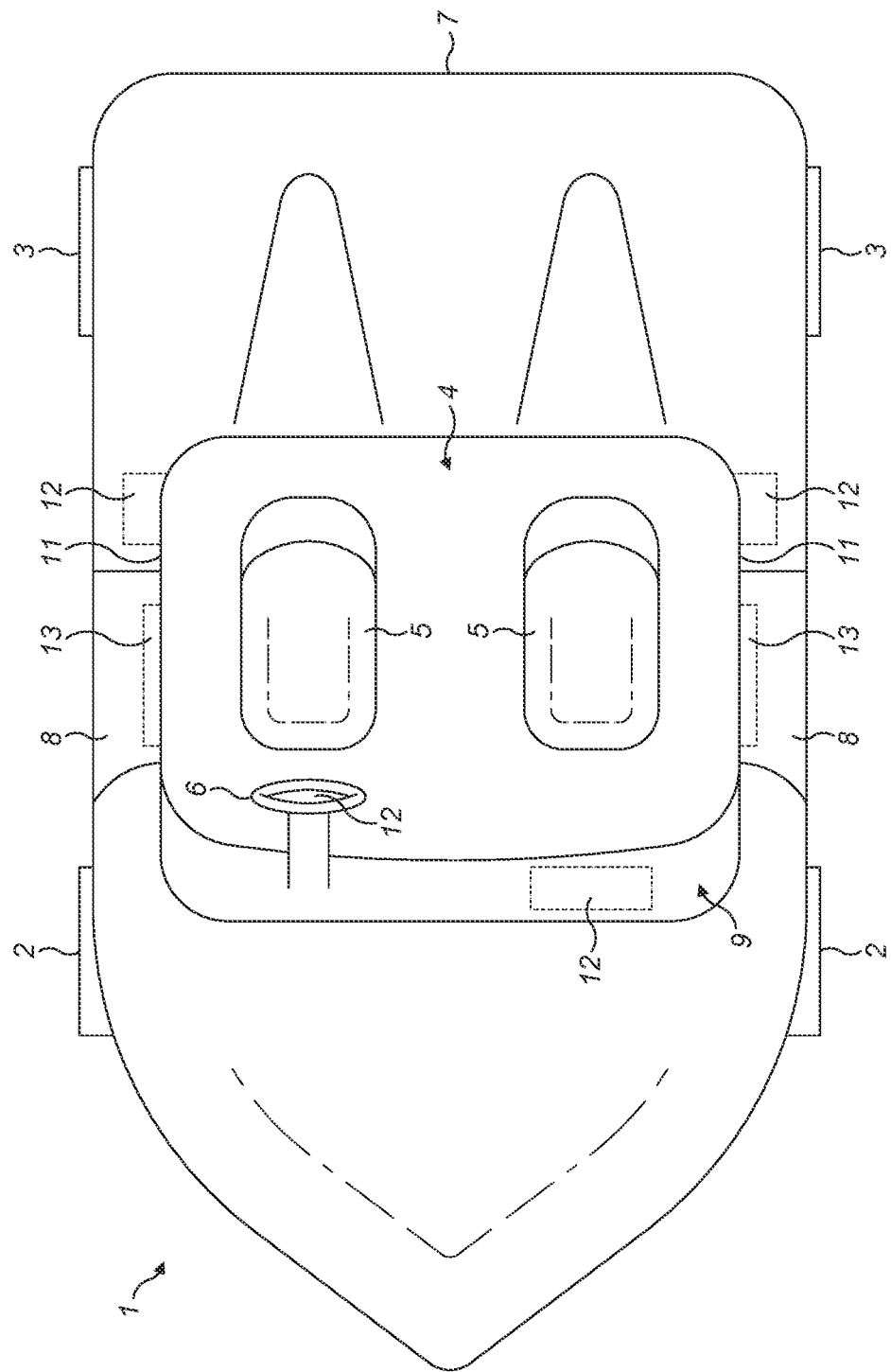
FIG. 1 shows a plan view of a vehicle with the roof not shown.

FIG. 1 shows a vehicle 1. The vehicle 1 may be an automobile. The vehicle 1 may be a car. The vehicle 1 comprises front wheels 2 and rear wheels 3. The front of the vehicle is defined with reference to the primary motion direction of the vehicle 1. The front of the vehicle 1 points in the primary motion direction of the vehicle. Generally, a vehicle has a primary motion direction that is the forward direction. The vehicle 1 comprises an occupant compartment 4. The occupant compartment 4 may comprise one or more seats 5 for occupants of the vehicle to sit in. Whilst two seats 5 are shown in FIG. 1 it will be appreciated that more may be included in the vehicle 1. The occupant compartment 4 may accommodate a driver. The occupant compartment may accommodate one or more passengers. The vehicle 1 may comprise controls located within the occupant compartment 4 to enable an occupant to control the motion of the vehicle. The occupant compartment 4 may also be known as a passenger compartment.

The vehicle comprises a vehicle body 7. The vehicle body 7 may comprise one or more openings through which an occupant may enter or exit the vehicle 1 or items such as luggage may be introduced to or taken from the vehicle 1. The vehicle 1 may comprise one or more doors 8 to close those openings. As pictured in FIG. 1, the vehicle 1 comprises two doors 8. It will be appreciated that the vehicle may comprise more or less doors 8 than this.

The vehicle 1 may comprise a roof. The roof may be fixed or it may be removable. The roof may be removable in that it can be stowed inside the vehicle or manually removed and stored elsewhere. The roof is not shown in FIG. 1 so that the occupant compartment 4 can be viewed. The occupant compartment 4 comprises an interior which forms the surfaces of the occupant compartment. The interior comprises a plurality of interior panels which form the occupant compartment 4. For example, the interior panels may include front facia panels 9 which may also be known as instrument panels 9, door panels, and pillars 11.

The vehicle 1 comprises at least one airbag device 12. As pictured in FIG. 1, the vehicle comprises four airbag devices 12. Airbag devices 12 may be located in any suitable location which an occupant may come into contact with during the vehicle colliding with another object. As pictured in FIG. 1, the vehicle 1 has airbags located in the front facia 9, the steering wheel 6, side pillars 11, and door casing 13. The vehicle may have airbag(s) located in the headlining of the occupant cabin.

FIG. 2 shows a close-up view of the instrument panel 9 of the vehicle 1 shown in FIG. 1. The front facia 9 comprises a facia panel 21. The facia panel 21 is a composite material panel. The composite material panel may be formed of reinforcement material interspersed with matrix material. In this way the composite material panel may be a fibre-reinforced composite material panel. The reinforcement material may be fibre reinforcement material. The reinforcement material may be carbon fibre. The composite material panel may be formed of fibre-reinforced polymer. The matrix material may be a resin, for instance epoxy.

The composite material panel 21 is positioned to cover the airbag device 12. Thus, from the view of an occupant of the occupant compartment 4 the airbag device 12 is located behind the composite material panel 21. The composite material panel 21 obscures the airbag device 12 so it cannot be seen from within the occupant compartment 4 during normal use of the vehicle 1. It will be appreciated that if the airbag device 12 deploys then it will be visible within the occupant compartment 4 but this constitutes a deviation from normal use as the vehicle 1 will have likely been in a collision or other accident.

Figure 2A:
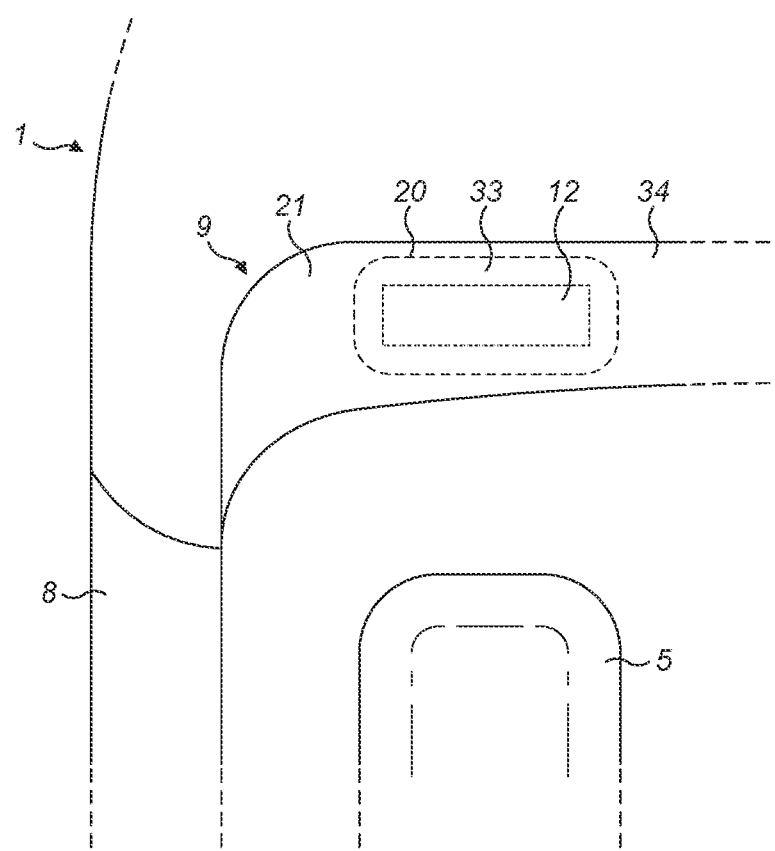
FIG. 2A shows a close-up view of an instrument panel area of the vehicle.
Figure 2B:
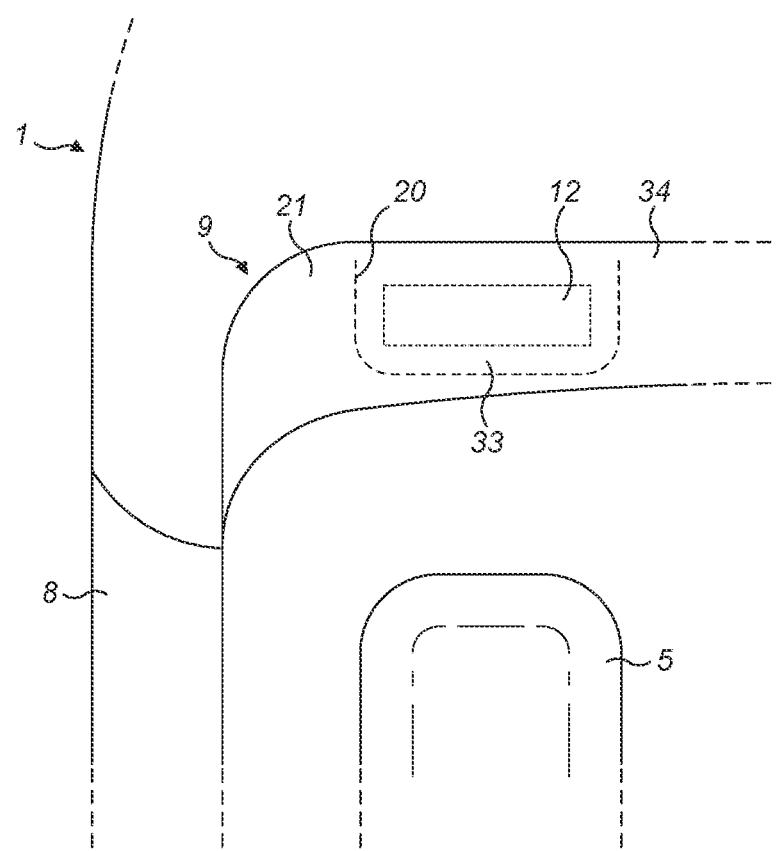
FIGS. 2B to 2D show alternative shaped break lines.
Figure 2C:
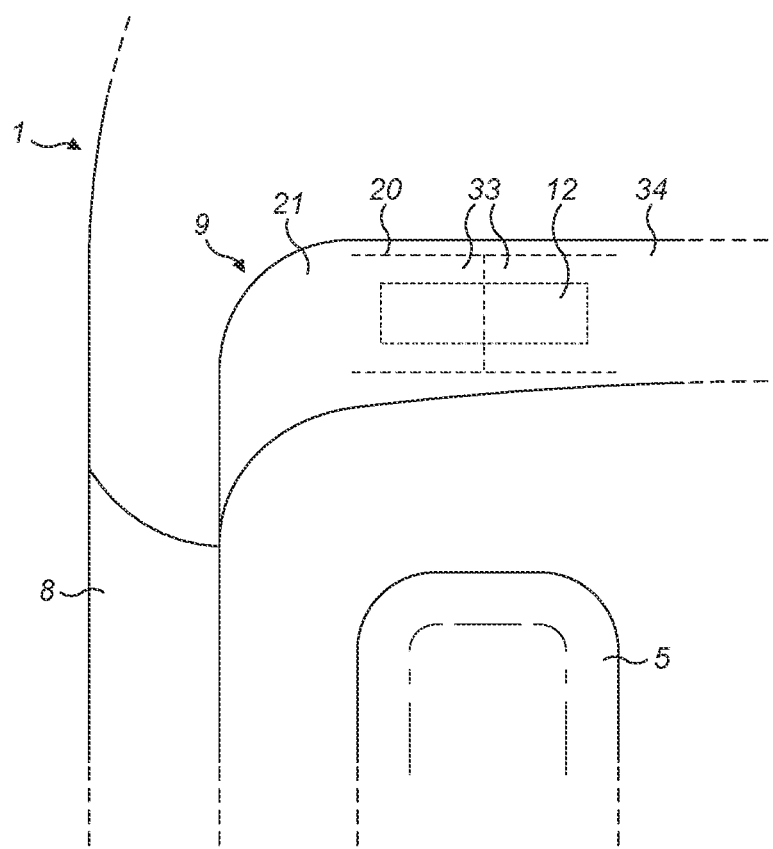
Figure 2D:
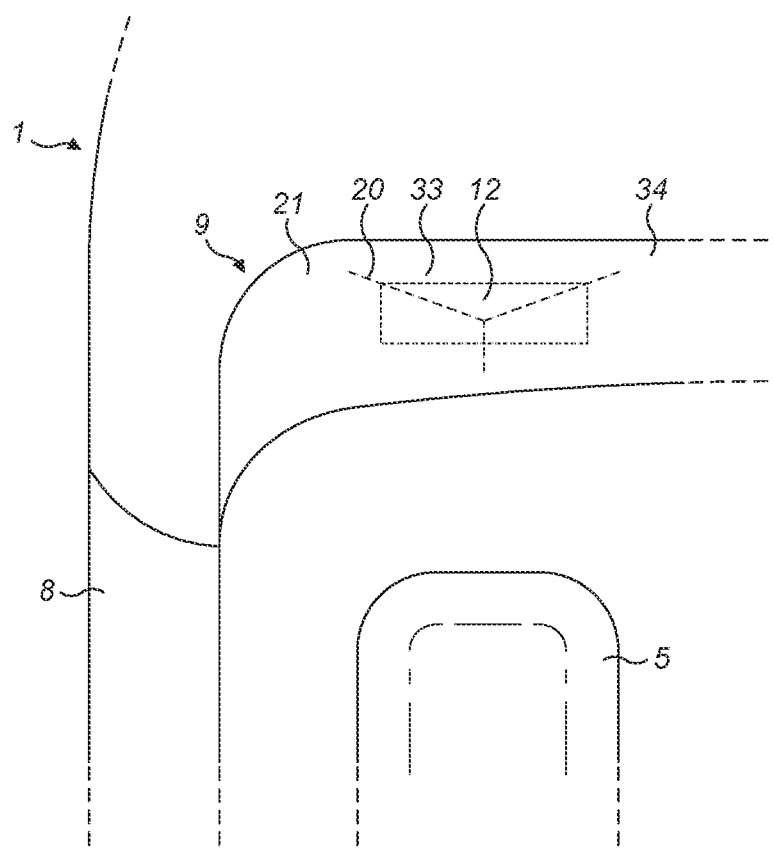

The composite material panel 21 comprises a break line 20. The break line 20 runs over the panel 21. The break line 20 shown in FIG. 2 forms a closed path running over the panel 21. The break line 20 may be a continuous line on the panel 21 over that closed path. The break line 20 may also be discontinuous but run along the closed path. The break line may also be a non-closed path shape. Examples are shown in FIGS. 2B to 2D. As shown in FIG. 2B, the break line may run around three sides of the airbag device 12 as projected on to the panel 21. The break line may be U-shaped. The break line may run around all but one side of the airbag device 12 as projected on to the panel 21. As shown in FIG. 2C, the break line may run along two opposite sides of the airbag device 12 as projected on to the panel 21 with a line joining those two opposite sides. The line may join the middle of the lines running along the two opposite sides. The break line may be H-shaped. As shown in FIG. 2D, the break line may be formed of three divergent lines that meet at a point. The point may be central to the airbag device 12 as projected on to the panel 21. The break line may be Y-shaped.

The break line 20 runs over the panel 21 in a way so that it is proximal to the airbag device 12. The airbag device 12 can cause the panel 21 to tear along the break line 20 when the airbag device 12 deploys. The break line 20 introduces a weakness in the panel 21 so that the tearing of the panel 21 can be controlled to occur along the break line 20. The panel 21 is therefore frangible along the break line 20.

Figure 3:
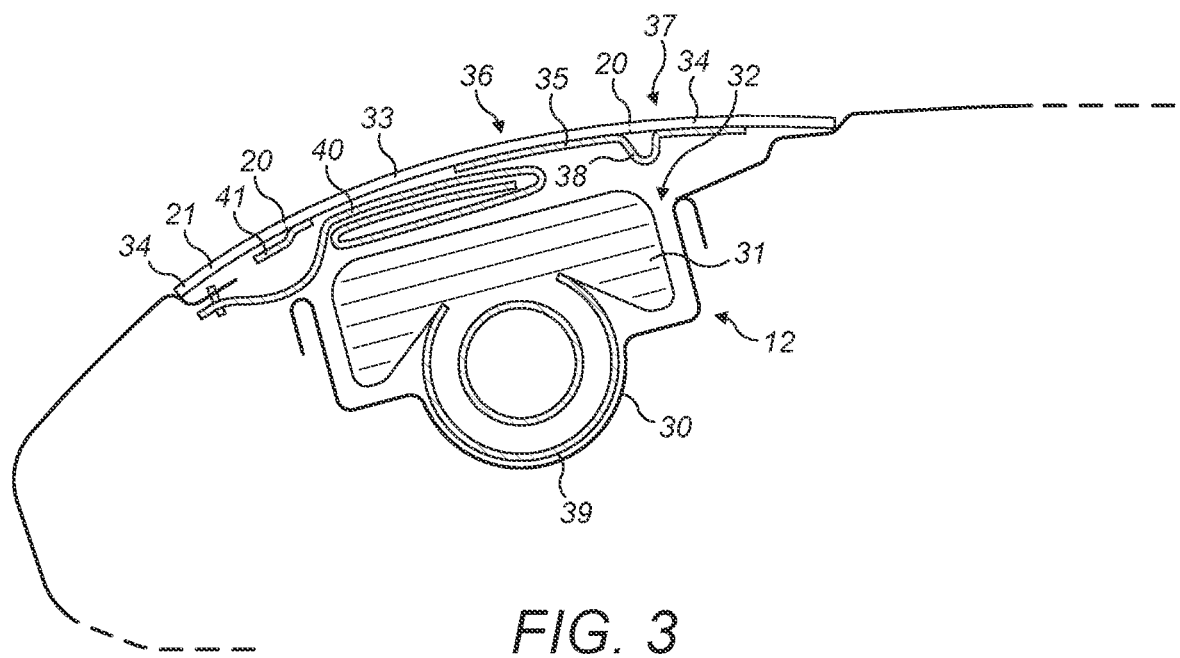
FIG. 3 shows a cut-through view of the area of the vehicle which contains an airbag device in an undeployed state.
Figure 4:
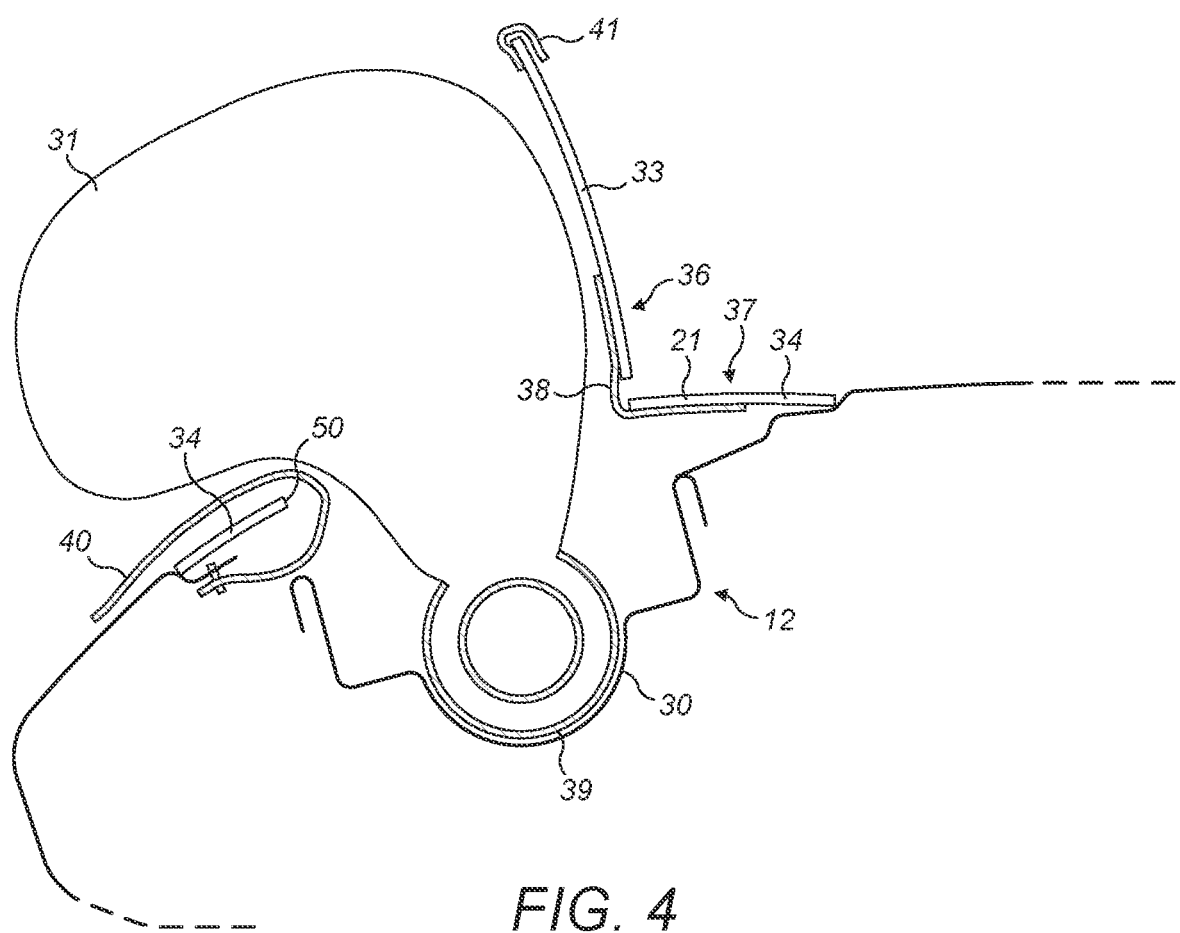
FIG. 4 shows a cut-through view of the area of the vehicle which contains an airbag device in a deployed state.

FIGS. 3 and 4 are cut through views of the area of the vehicle 1 which contains the panel 21 and the airbag device 12. FIG. 3 shows the airbag device 12 in an undeployed state. FIG. 4 shows the airbag device 12 in a deployed state.

Airbag device 12 comprises a housing 30. The housing 30 is attached to the vehicle 1. The housing 30 may be attached to a substructure of the occupant compartment 4 of the vehicle 1. The airbag device 12 comprises an airbag 31. The airbag 31 has a packed configuration, as shown in FIG. 3. The airbag 31 has an expanded configuration, as shown in FIG. 4. In the packed configuration, the airbag 31 is located within the housing 30. In the expanded configuration, the airbag 31 extends outside of the housing 30 to provide a cushion to an occupant located in the proximity of the airbag 31 during a vehicle collision. It will be appreciated that the airbag 31 may only be in the fullest expanded configuration for a brief period of time when it is fully inflated.

The housing 30 has an aperture 32 through which the airbag 31 expands when moving from the packed configuration to the expanded configuration. The aperture 32 may be known as the chute of the airbag device 12. The aperture 32 may be known as the guide channel of the airbag device 12. The aperture 32 provides a path for the airbag 31 to expand through when being inflated. The airbag device 12 comprises an inflator 39. The inflator 39 is coupled to the airbag 31 to provide gas to the airbag 31 to cause it to inflate. The gas may be generated by a chemical reaction inside the inflator 39. The inflation of the airbag 31 causes the airbag 31 to move from the packed configuration to the expanded configuration. The activation of the inflator 39 may be controlled by sensors in the vehicle 1 which detect a collision situation of the vehicle 1. The packed configuration of the airbag 31 corresponds with the airbag device 12 being in an undeployed state. The expanded configuration of the airbag 31 corresponds with the airbag device 12 being in a deployed state.

As shown in FIGS. 3 and 4, the break line 20 runs over the panel 21 in a way so that it is proximal to the aperture 32 of the airbag device 12. Therefore, when the airbag 31 moves from to the expanded configuration the airbag 31 forces the panel 21 to tear along the break line 21. The break line 20 may run over the panel 21 so that the panel first starts to tear in a selected part of the break line 20. This may be selected by positioning part of the break line 20 closer to the airbag 31 than other parts of the break line 20. The airbag 31 may also be shaped so that the initial expansion of the airbag 31 causes pressure to be applied first to a selected region of the panel 21 which causes the break line 20. However, usually the airbag 31 will be of a standard shape and the panel 21 position and break line 20 position will be selected to cause the required tearing. The break line 20 means that the panel 21 comprises a detachable portion 33 within the break line 20 and a fixed portion 34 outside of the break line 20. The detachable portion 33 may be the portion of the panel 21 which moves when the airbag 31 forces the panel 21 to tear along the break line 20.

To ensure that the detachable portion 33 moves in a required and safe manner when being forced by the airbag 31, the vehicle may comprise a tether 35 attached between the detachable portion 33 and the fixed portion 34. The tether 35 defines the motion path of the detachable portion 33 as the panel 21 is forced by the airbag 31. The tether 35 comprises a first attachment region 36 to the detachable portion 33 and a second attachment region 37 to the fixed portion 34. The tether 35 comprises an unattached portion 38 between the first and second attachment regions. The configuration of the tether 35 with an unattached portion permits the detachable portion 33 to move away from the airbag device 12. When the airbag device 12 is positioned underneath the panel 21 then the configuration of the tether 35 with an unattached portion permits the detachable portion 33 to move up and away from the airbag device 12. In both cases, the tether then reaches full extension and thus causes the detachable portion 33 to rotate relative to the fixed portion 34. The tether 35 defines a rotation axis that the detachable portion 33 rotates about. The rotation axis is controlled by the length of the unattached portion 38. In this way, the distance of the rotation axis from the fixed portion 34 is defined by the length of the unattached portion 38.

Figure 11:
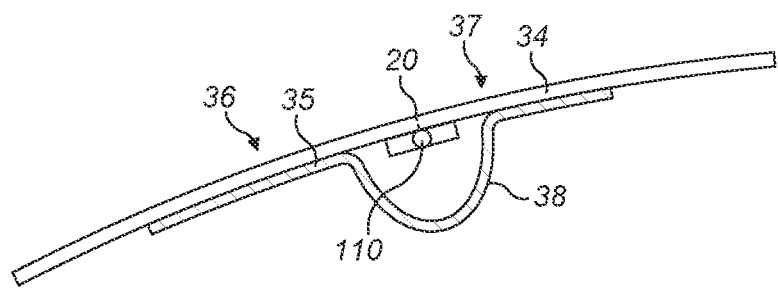
FIG. 11 shows a close-up view of a region of the panel.

FIG. 11 shows a close-up view of a region of the panel. The vehicle may comprise a hinge 110 which is attached between the detachable portion 33 and the fixed portion 34. The hinge 110 may run along one portion of the break line 20. The hinge 110 defines a motion path of the detachable portion 33 as the panel 21 is forced by the airbag 31. The rotation axis of the detachable portion 33 is defined by the rotation axis of the hinge. The rotation axis may be aligned with the portion of the break line 20 along which the hinge 110 runs. The hinge 110 may be combined with the tether 35 as shown in FIG. 11. In this case, the tether 35 may provide an additional safety feature in the situation where the hinge 110 cannot take the load associated with the expansion of the airbag 31. Alternatively, the hinge 110 may be configured to break after controlling the initial rotation of the detachable portion 33. In this way, the hinge 110 may be frangible.

As discussed herein, the position of the airbag 31 relative to the break line 20 can be selected to cause the panel 21 to start tearing in a particular location. The position of the airbag 31 may be selected to mean that the expansion of the airbag 31 causes the panel to tear starting from a portion of the break line 20 that is remote from the tether 35. The tether 35 may be attached to one side of the detachable portion 33 and the position of the airbag 31 is selected to cause the panel to tear initially on the opposite side of the detachable portion 33. The tether 35 may be attached to the fixed portion 33 in a position remote from where an occupant of the vehicle 1 would sit. In this way, the detachable portion 33 is caused to rotate away from where an occupant of the vehicle 1 would sit.

The composite material panel 21 is likely to have sharp edges along the break line 20 once the panel 21 has torn. This may cause the airbag 31 to be punctured during inflation. To assist in avoiding puncturing the airbag 31 in this situation, the vehicle 1 may comprise a first protection flap 40. The first protection flap 40 has an initial configuration as shown in FIG. 3. The initial configuration may be a folded configuration. The first protection flap 40 has a deployed configuration as shown in FIG. 4. In the initial configuration, the first protection flap 40 is attached to the vehicle 1 at one end of the first protection flap 40. The opposite end of the first protection flap 40 is unattached to permit it to move during expansion of the airbag 31. The first protection flap 40 may be folded up in the initial configuration. The first protection flap 40 may be folded up so that it sits on the surface of the airbag 31 that will be forced away from the rest of the airbag device 12 during expansion of the airbag. The first protection flap 40 may be folded up and attached to the surface of the panel 21 that faces the airbag device 12. The first protection flap 40 is forced to move from the initial configuration to the deployed configuration during movement of the airbag 31 to the expanded configuration. The first protection flap 40 may be attached to the vehicle 1 so that when forced into the deployed configuration the first protection flap covers an edge 50 of the panel that runs along one side of the break line. The first protection flap 40 may be attached to the vehicle 1 so that when forced into the deployed configuration the first protection flap covers multiple sides of the break line. It may cover three sides of the break line 20. It may cover all sides of the break line 20. The first protection flap 40 may cover all but one portion of the break line. This portion being the part where the detachable portion 33 is closest to once detached from the rest of the panel 34. The edge 50 being formed by the tearing of the panel due to the airbag moving to the expanded configuration.

The vehicle 1 may comprise a second protection flap 41. The second protection flap 41 has an initial configuration as shown in FIG. 3. The second protection flap 41 has an extended configuration as shown in FIG. 4. In the initial configuration, the second protection flap 41 is attached to the detachable portion 33 at one end of the second protection flap 41. The opposite end of the second protection flap 41 is unattached to permit it to move during expansion of the airbag 31. The second protection flap may be folded up in the initial configuration. The second protection flap 41 may lay underneath the panel 21 in the initial configuration. The second protection flap 41 moves with the detachable portion 33 as the detachable portion 33 moves due to being forced by the airbag 31 moving to its expanded configuration. The second protection flap 41 is forced to move to its extended configuration during the movement of the detachable portion 33. The second protection flap 41 covers at least one edge of the detachable portion once the detachable portion 33 is at least partially detached. The second protection flap 41 may cover an edge of the detachable portion 33 which is remote from the tether 35.

Figure 5:
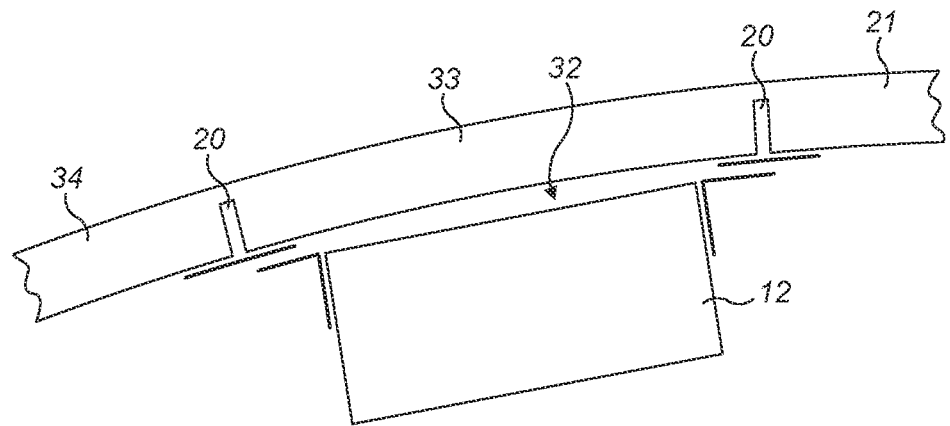
FIG. 5 shows a close-up cut-through view of a panel covering the airbag device.

FIG. 5 shows a close-up cut-through view of part of the panel 21 and the airbag device 12. The airbag device 12 is shown schematically in FIG. 5 without showing any of the components comprised as part of the airbag device 12. FIG. 5 shows one configuration of the break line 20 where the break line 20 is formed as a channel in the panel 21. FIG. 5 shows the break line 20 being offset from the aperture 32 of the airbag device 12. The break line 20 is positioned outside of the aperture 32 in a direction perpendicular to the general movement direction of the airbag 31 as it moves to the expanded configuration.

Figure 6:
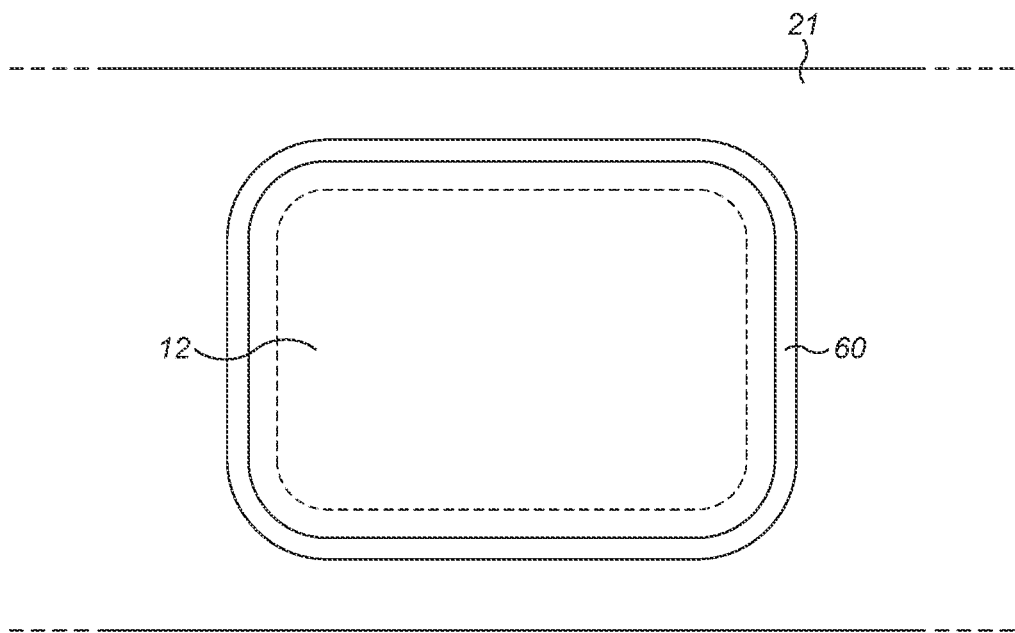
FIG. 6 shows a first design of a break line.
Figure 7:
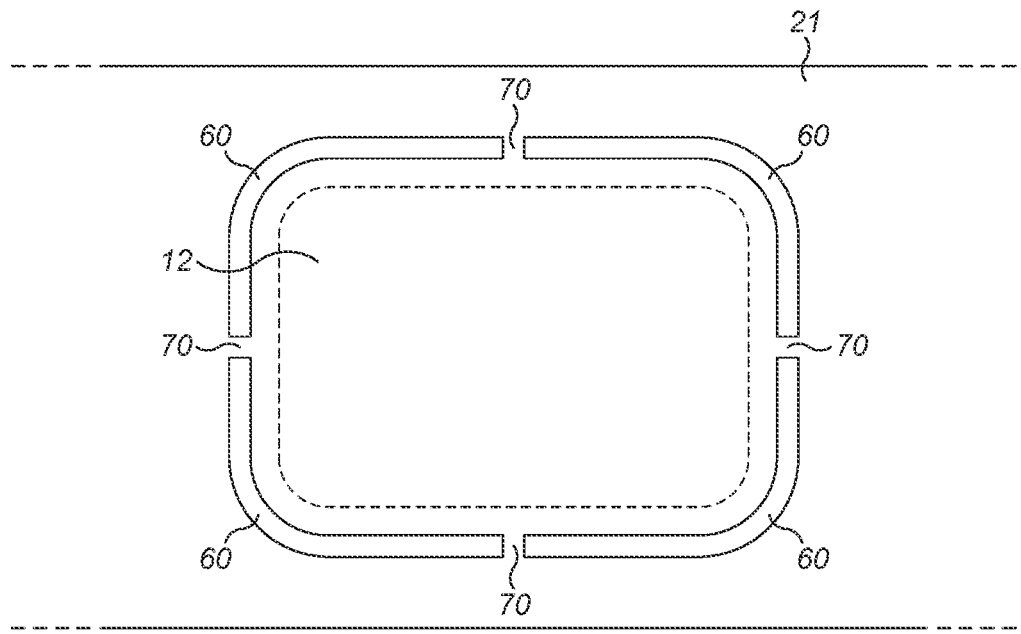
FIGS. 7 and 8 shows alternative versions of the first design of break line.
Figure 8:
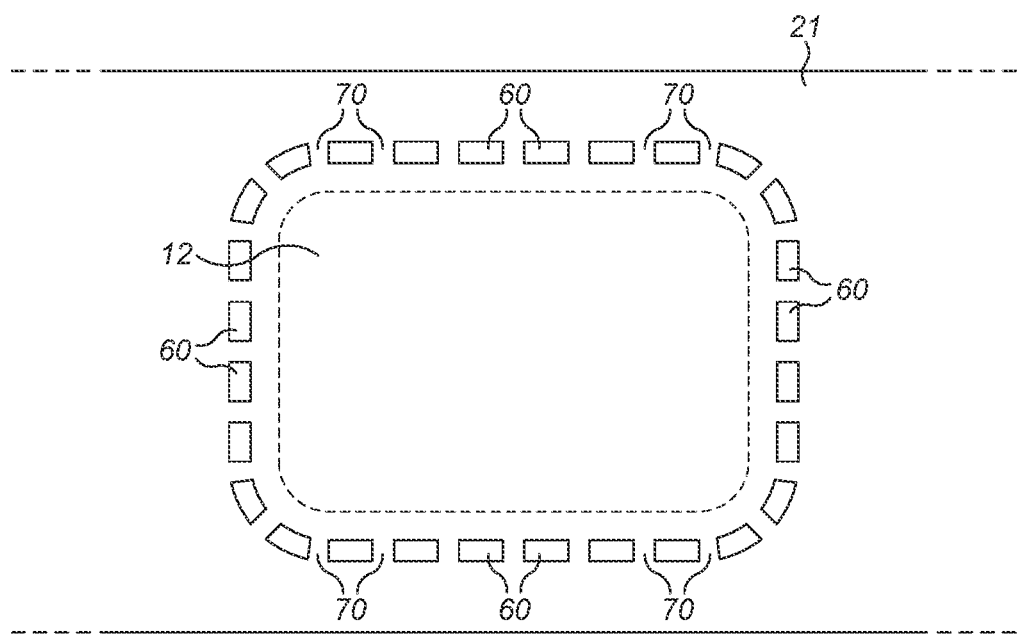

FIG. 6 shows a first design of the break line 60. FIG. 6 shows the surface of the panel 21 that faces the airbag device 12. The break line 60 is a groove in the panel. The groove does not run through the whole thickness of the panel. In this way, the groove has a depth less than the panel thickness. The groove may be continuous as shown in FIG. 6. FIGS. 7 and 8 show the surface of the panel 21 that faces the airbag device 12. As shown in FIGS. 7 and 8, the groove is broken by full thickness portions 70 of the panel. Not all of the full thickness portions 70 are labelled in FIG. 8 but it will be apparent that they are located between portions of the groove. In FIG. 7, the groove is separated by full thickness portions 70 which have a length less than the length of each section of the groove 60. In FIG. 8, the groove 60 is separated by full thickness portions 70 which have a length which is comparable to the length of each section of the groove 60.

Figure 9:
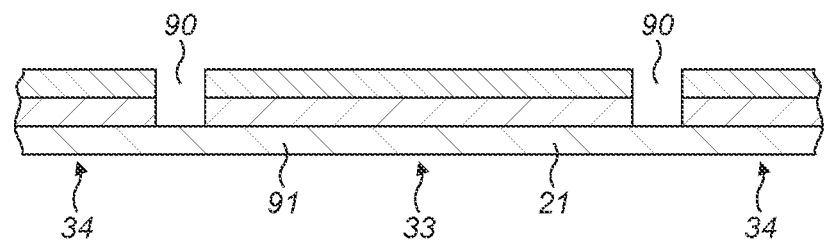
FIG. 9 shows a cut-through view of the panel showing a lay-up of the panel.

The groove in the panel 21 may be formed by cutting the panel 21. The cutting may use laser etching. The cutting may use a blade. The groove in the panel 21 may be formed during the lay-up process of the composite material panel 21. FIG. 9 shows a cut-through view of the panel 21. As shown in FIG. 9, layers of reinforcement material may be laid-up with a gap to form the groove. A layer of reinforcement material may form a continuous layer 91 of the panel which forms the surface visible from within the vehicle. Other layers of reinforcement material form the gap in the side of the panel which forms the surface facing the airbag device. Whilst the thickness of the layers is shown as being approximately the same, it will be appreciated that different thicknesses may be used. The detachable portion 33 of the panel may be a different thickness than the fixed portion 34. The detachable portion 33 may be thicker than the fixed portion 34. The gap 90 may have angled sides rather than being perpendicular to the panel surface as shown in FIG. 9. This may be achieved by the layers of reinforcement material having a staggered end at the gap so that the layers further from the continuous layer 91 form a larger gap 90 than those layers closer to the continuous layer 91.

Once the reinforcement material has been laid-up it can be fixed in position using a forming technique such as RTM or by use of an autoclave if the reinforcement material already contains a matrix material.

Figure 10:
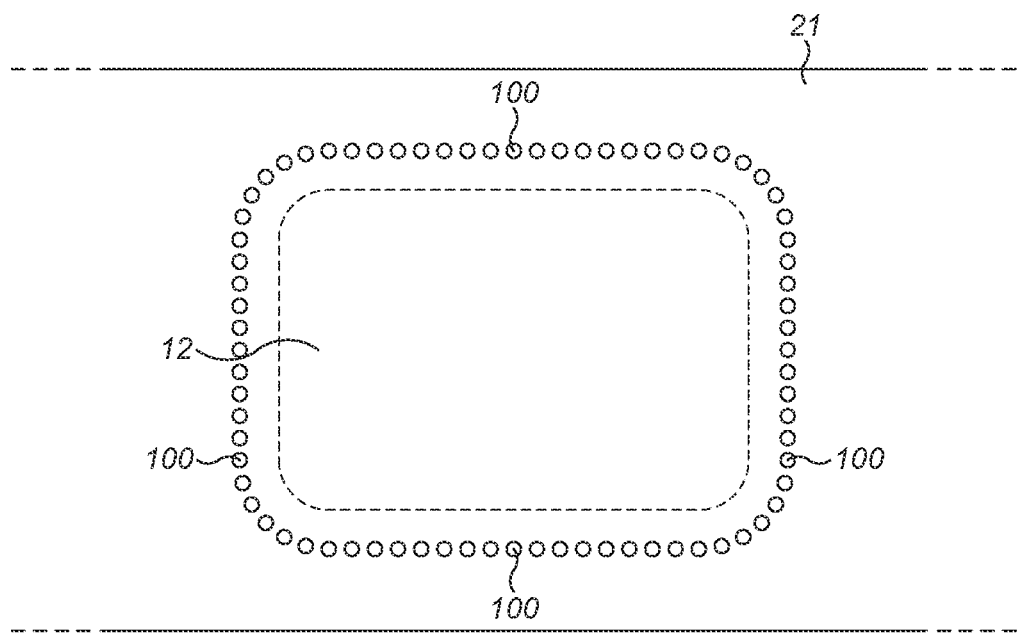
FIG. 10 shows a second design of a break line.

FIG. 10 shows a second design of the break line 100. FIG. 10 shows the surface of the panel 21 that faces the airbag device 12. The break line 100 is formed of perforations in the panel along the break line. The perforations may be holes that run through part thickness or full thickness of the panel 21. The perforations may be formed by micro-drilling the holes into the panel 21. The micro-drilling may be performed by a physical micro-drill, by laser ablation and/or by chemical etching. The break line 100 may be formed by a series of micro-drilled holes. A surface layer may be present on the surface visible from within the vehicle. The surface layer may fill the perforations so that they do not run completely from one side of the panel 21 to the other. The surface layer may be a lacquer layer. The surface layer may be a paint layer. The surface layer may be a film applied to the panel 21, such as a coverstock wrap layer. The coverstock wrap may be any suitable material such as leather, alcantara or vinyl.

It will be appreciated that any combination of the configurations shown in FIGS. 6 to 10 could be combined together to form the break line 20.

The panel forms a visible surface of the occupant cabin. One surface of the panel may face the occupant cabin whilst the opposite surface faces the airbag device 12. The panel may form part of the facia of the occupant cabin. Thus, the airbag device covered by the panel may be a front airbag device in the occupant cabin. The airbag device may be a front passenger airbag device. The panel may form part of a pillar of the occupant cabin. The pillar may be located to one side of the occupant cabin. The pillar may be located beside a seat of the occupant cabin. Thus, the airbag deice covered by the panel may be a side airbag device in the occupant cabin. The panel may cover any suitable location of airbag device within the occupant cabin.

The use of a composite material panel to cover the airbag device can reduce the weight of the vehicle. Furthermore, by configuring the panel to have a break line rather than being formed of separate panels that are joined together a further weight saving can be gained as the joint between the detachable portion and fixed portion is generated by the removal of material to form the break line. This compounds the benefit of using a composite material panel as a cover to an airbag. In addition, the break line has the function of weakening the material locally to ensure that the breakage of the panel happens along the break line. This avoids the panel shattering and causing sharp fragments of the panel to scatter around the occupant cabin. However, the weakening line is made in such a way that it is not visible from the occupant cabin so that it is imperceptible to an occupant in the cabin during normal use.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
   an airbag device comprising a housing and an airbag, the airbag having a packed configuration and an expanded configuration, the airbag expanding through an aperture in the housing when moving from the packed configuration to the expanded configuration;
   a composite material panel positioned to cover the airbag device, the panel comprising a break line running over the panel, a detachable portion within the break line and a fixed portion outside of the break line, the detachable portion becoming at least partially detached when the airbag forces the panel to tear along the break line, the break line being proximal to the aperture so that when the airbag moves to the expanded configuration the airbag forces the panel to tear along the break line;
   a first protection flap, the first protection flap having an initial configuration where the first protection flap is located adjacent the airbag in the packed configuration and a deployed configuration where the first protection flap covers at least one edge of the panel that runs along one side of the break line when the panel has torn due to the airbag moving to the expanded configuration;
   a tether attached between the detachable portion and the fixed portion; and
   a second protection flap, the second protection flap being attached to the detachable portion at one end of the second protection flap and the second protection flap being unattached at an opposite end of the second protection flap, the second protection flap being configured to cover at least one edge of the detachable portion once the detachable portion is at least partially detached.

2. A vehicle according to claim 1, wherein the composite material panel is formed of reinforcement material interspersed with matrix material.

3. A vehicle according to claim 2, wherein the reinforcement material is carbon fibre.

4. A vehicle according to claim 1, wherein the composite material panel is formed of fibre-reinforced polymer.

5. A vehicle according to claim 1, wherein the aperture in the housing is a chute through which the airbag expands when moving to the expanded configuration.

6. A vehicle according to claim 1, wherein the break line forms a closed path running over the panel.

7. A vehicle according to claim 1, wherein the break line is formed of perforations in the panel along the break line.

8. A vehicle according to claim 1, wherein the break line is a groove in the panel.

9. A vehicle according to claim 8, wherein the groove is formed in a surface of the panel facing the airbag device.

10. A vehicle according to claim 8, wherein the groove is broken by full thickness portions of the panel.

11. A vehicle according to claim 8, wherein the groove is formed by cutting the groove into the panel.

12. A vehicle according to claim 8, wherein the groove is formed during a forming process for the panel by laying up reinforcement material with a gap to form the groove.

13. A vehicle according to claim 8, wherein the panel is formed of a continuous layer of reinforcement material which forms a surface visible from within the vehicle, and layers of reinforcement material applied to the surface of the panel facing the airbag device with a gap to form the groove.

14. A vehicle according to claim 1, wherein the break line is formed by a series of micro-drilled holes.

15. A vehicle according to claim 1, wherein the tether permits the detachable portion to move away from the airbag device prior to rotating about an axis defined by the tether.

16. A vehicle according to claim 1, wherein the airbag device is positioned relative to the panel so that when the airbag moves to the expanded configuration the airbag forces the panel to tear starting from a portion of the break line remote from the tether.

17. A vehicle according to claim 1, the vehicle comprising an occupant cabin and the panel forming a visible surface of the occupant cabin, the panel forms part of a facia of the occupant cabin and/or the panel forms part of a pillar of the occupant cabin.

18. A vehicle according to claim 17, wherein the airbag device is one of: a front airbag device in the occupant cabin, a side airbag device in the occupant cabin, and a driver airbag device mounted in a steering wheel of the vehicle.

19. A vehicle comprising:
- an airbag device comprising a housing and an airbag, the airbag having a packed configuration and an expanded configuration, the airbag expanding through an aperture in the housing when moving from the packed configuration to the expanded configuration;
- a composite material panel positioned to cover the airbag device, the panel comprising a break line running over the panel, a detachable portion within the break line and a fixed portion outside of the break line, the detachable portion becoming at least partially detached when the airbag forces the panel to tear along the break line, the break line being proximal to the aperture so that when the airbag moves to the expanded configuration the airbag forces the panel to tear along the break line;
- a first protection flap, the first protection flap having an initial configuration where the first protection flap is located adjacent the airbag in the packed configuration and a deployed configuration where the first protection flap covers at least one edge of the panel that runs along one side of the break line when the panel has torn due to the airbag moving to the expanded configuration;
- a tether attached between the detachable portion and the fixed portion; and
- a second protection flap, the second protection flap being attached to the detachable portion at one end of the second protection flap and the second protection flap being unattached at an opposite end of the second protection flap, the second protection flap being configured to cover at least one edge of the detachable portion that is remote from the tether once the detachable portion is at least partially detached.

* * * * *